(12) United States Patent
Lo et al.

(10) Patent No.: US 9,419,661 B2
(45) Date of Patent: *Aug. 16, 2016

(54) IMPULSE NOISE MITIGATION UNDER OUT-OF-BAND INTERFERENCE CONDITIONS

(71) Applicant: MaxLinear, Inc., Carlsbad, CA (US)

(72) Inventors: Andy Lo, San Diego, CA (US); Sugbong Kang, San Diego, CA (US)

(73) Assignee: Maxlinear, Inc, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,204

(22) Filed: Oct. 19, 2015

(65) Prior Publication Data

US 2016/0049971 A1   Feb. 18, 2016

Related U.S. Application Data

(63) Continuation of application No. 14/444,489, filed on Jul. 28, 2014, now Pat. No. 9,166,637, which is a continuation of application No. 13/941,604, filed on Jul. 15, 2013, now Pat. No. 8,792,543, which is a continuation of application No. 12/924,185, filed on Sep. 22, 2010, now Pat. No. 8,488,663.

(51) Int. Cl.
*H03H 7/30* (2006.01)
*H03K 5/01* (2006.01)
*H04B 1/10* (2006.01)

(52) U.S. Cl.
CPC ............. *H04B 1/1036* (2013.01); *H04B 1/10* (2013.01)

(58) Field of Classification Search
USPC ......... 375/229–236, 219, 220, 222, 221, 211, 375/240.26–240.29, 284, 285, 295, 316, 375/346, 350, 340, 324
See application file for complete search history.

(56) References Cited

U.S. PATENT DOCUMENTS

| | | |
|---|---|---|
| 4,703,447 A | 10/1987 | Lake |
| 5,065,410 A | 11/1991 | Yoshida et al. |
| 5,226,057 A | 7/1993 | Boren |
| 5,410,264 A | 4/1995 | Lechleider |
| 5,818,929 A | 10/1998 | Yaguchi |
| 6,005,485 A | 12/1999 | Kursawe et al. |
| 6,385,261 B1 | 5/2002 | Tsuji et al. |

(Continued)

OTHER PUBLICATIONS

Int'l Search Report and Written Opinion for PCT/US2010/002598 dated Nov. 15, 2010.

(Continued)

*Primary Examiner* — Linda Wong
(74) *Attorney, Agent, or Firm* — McAndrews, Held & Malloy

(57) ABSTRACT

An impulse noise mitigation circuit (INMC) may set a cut-off frequency of each of two high pass filters to bound a frequency bandwidth of a desired signal, wherein a first of the two filters allows frequencies higher than the frequency bandwidth of the desired signal, and a second of the two filters allows frequencies lower than the frequency bandwidth of the desired signal. The INMC may compute and store a mean magnitude separately for a first signal response of the first filter and a second signal response of the second filter. The INMC may select the first filter for impulse noise mitigation when the mean magnitude of the second filter is greater than the mean magnitude of the first filter. The INMC may select the second filter for impulse noise mitigation when the mean magnitude of the first filter is greater than the second filter.

19 Claims, 3 Drawing Sheets

(56) References Cited

U.S. PATENT DOCUMENTS

| | | | |
|---|---|---|---|
| 6,647,070 B1 | 11/2003 | Shalvi et al. | |
| 6,741,644 B1 * | 5/2004 | Dehghan | H03H 17/0294 375/229 |
| 6,795,559 B1 | 9/2004 | Taura et al. | |
| 6,920,194 B2 | 7/2005 | Stopler et al. | |
| 6,944,301 B1 | 9/2005 | Nohrden et al. | |
| 7,016,739 B2 | 3/2006 | Bange et al. | |
| 7,035,361 B2 | 4/2006 | Kim et al. | |
| 7,139,338 B2 | 11/2006 | Wilson et al. | |
| 7,302,024 B2 | 11/2007 | Arambepola | |
| 7,302,240 B2 | 11/2007 | Koga et al. | |
| 7,463,084 B2 | 12/2008 | Hao et al. | |
| 7,499,497 B2 | 3/2009 | Huang et al. | |
| 7,538,822 B2 | 5/2009 | Lee et al. | |
| 7,558,337 B2 | 7/2009 | Ma et al. | |
| 7,573,966 B2 | 8/2009 | Kim et al. | |
| 7,587,010 B2 | 9/2009 | Morie et al. | |
| 7,630,448 B2 | 12/2009 | Zhidkov | |
| 7,676,046 B1 | 3/2010 | Nelson et al. | |
| 7,769,304 B2 | 8/2010 | Sakamoto et al. | |
| 7,907,511 B2 * | 3/2011 | Kim | H04B 1/59 370/208 |
| 7,920,839 B2 * | 4/2011 | Shi | H04B 1/1036 455/161.3 |
| 8,194,808 B2 * | 6/2012 | Gaikwad | H04L 7/046 375/260 |
| 8,488,663 B2 | 7/2013 | Lo et al. | |
| 2003/0108251 A1 * | 6/2003 | Kim | G06T 5/20 382/285 |
| 2004/0213366 A1 | 10/2004 | Ono | |
| 2006/0023823 A1 | 2/2006 | Sun et al. | |
| 2007/0291178 A1 | 12/2007 | Chao et al. | |
| 2008/0181294 A1 * | 7/2008 | Andrle | H04B 1/1027 375/239 |
| 2008/0226001 A1 | 9/2008 | Geng et al. | |
| 2008/0239154 A1 * | 10/2008 | Yamauchi | G06T 5/002 348/607 |
| 2009/0005997 A1 | 1/2009 | Willen | |
| 2009/0082691 A1 | 3/2009 | Denison et al. | |
| 2009/0168929 A1 | 7/2009 | Liu et al. | |
| 2009/0216353 A1 | 8/2009 | Van Reck | |
| 2009/0323903 A1 | 12/2009 | Cioffi et al. | |
| 2010/0054150 A1 | 3/2010 | Oksman et al. | |

OTHER PUBLICATIONS

Int'l Prelim. Report on Patentability for PCT/US2010/002598 dated Apr. 5, 2012.

* cited by examiner

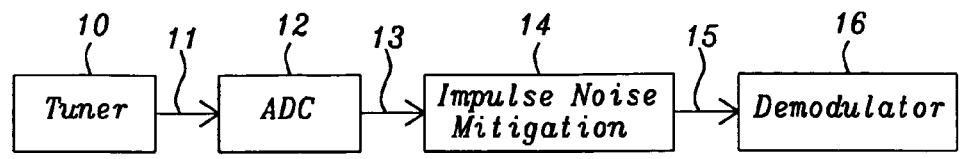
FIG. 1 - Prior Art
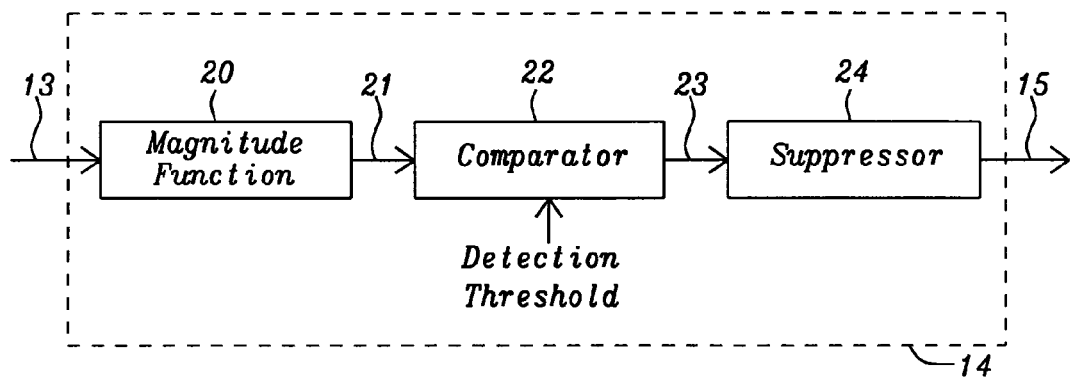
FIG. 2 - Prior Art
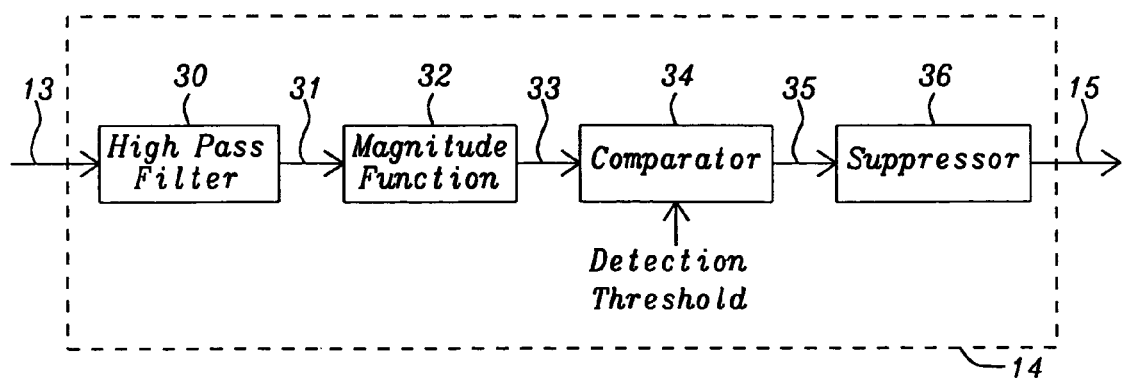
FIG. 3 - Prior Art

IMPULSE NOISE MITIGATION UNDER OUT-OF-BAND INTERFERENCE CONDITIONS

CLAIM OF PRIORITY

This application is a continuation of U.S. patent application Ser. No. 14/444,489 filed on Jul. 14, 2014 and now patented as U.S. Pat. No. 9,166,637, which is a continuation of U.S. patent application Ser. No. 13/941,604 filed on Jul. 15, 2013 and now patented as U.S. Pat. No. 8,792,543, which is a continuation of U.S. patent application Ser. No. 12/924,185 filed on Sep. 22, 2010, now patented as U.S. Pat. No. 8,488,663, which is herein incorporated by reference in its entirety.

BACKGROUND OF THE INVENTION

1. Field of Invention

The present invention is related to a wireless communication receiver and in particular impulse noise mitigation.

2. Description of Related Art

Noise and in particular impulse noise, which is generated in short bursts, can be disruptive to data (broadcasts) that are processed through an analog receiver and translated into a digital format to produce a quality output as one might experience in a received radio transmission. The impulse noise can be caused by many modern day sources in which ignition systems and domestic appliances represent a couple of sources. Elimination or mitigation of impulse noise is essential to a clear reproduction of the received analog signal into a digital signal format.

US Patent Application Publication 2010/0054150 (Oksman et al.) is directed to a method and system in which impulse noise is monitored and noise protection parameters are adjusted. In US Patent Application Publication 2009/0323903 (Cioffi et al.) a method and apparatus is directed to monitoring and adjusting noise abatement in a DSL link. In US Patent Application Publication 2009/0168929 (Liu et al.) a method and apparatus is directed to an adaptive impulse noise detection and suppression. In US Patent Application Publication 2003/0099287 (Arambepola) a method and apparatus is directed to detecting impulse noise in COFDM modulated TV signals. U.S. Pat. No. 7,676,046 B1 (Nelson et al.) is directed to a method of removing noise and interference from a signal by calculating a time-frequency domain of the signal and modifying each instantaneous frequency. U.S. Pat. No. 7,630,448 B2 (Zhidkov) is directed to a method to reduce noise in a multiple carrier modulated signal by estimating impulse noise and removing the noise as a function of the estimated impulse noise. U.S. Pat. No. 7,573,966 B2 (Kim et al.) is directed to a signal conditioning filter and a signal integrity unit to address equalization and noise filtering to improve signal fidelity. In U.S. Pat. No. 7,558,337 B2 (Ma et al.) a method and apparatus is directed to signal processing to mitigate impulse noise. In U.S. Pat. No. 7,499,497 B2 (Huang et al.) a method and apparatus is directed to suppression of impulse noise in an OFDM system. U.S. Pat. No. 7,302,240 B2 (Koga et al.) is directed to a communication apparatus that has an ADC to convert an analog signal to a digital signal before applying an noise detector.

U.S. Pat. No. 7,139,338 B2 (Wilson et al.) is directed to a receiver with a filter and an impulse response from which a controller adapts the impulse response to the filter. U.S. Pat. No. 7,035,361 B2 (Kim et al.) is directed to a signal conditioning filter and a signal integrity unit to address coupled problems of equalization and noise filtering. In U.S. Pat. No. 7,016,739 B2 (Bange et al.) a system and method is directed to removing narrowband from an input signal in which notch frequencies of notch filters are adjusted in accordance with a detected noise spectrum. In U.S. Pat. No. 6,920,194 B2 (Stopler et al.) a method and system is directed to correcting impulse noise present on an input signal. U.S. Pat. No. 6,795,559 B1 (Taura et al.) is directed to an impulse noise reducer, which detects and smoothes impulse noise on an audio signal. U.S. Pat. No. 6,647,070 B1 (Shalvi et al.) is directed to a method and apparatus for combating impulse noise in digital communication channels. U.S. Pat. No. 6,385,261 B1 (Tsuji et al.) is directed to an impulse noise detector an noise reduction system in an audio signal. U.S. Pat. No. 5,410,264 (Lechleider) is directed to an impulse noise canceller, which recognizes, locates and cancels impulse noise on an incoming signal. U.S. Pat. No. 5,226,057 (Boren) is directed to adaptive digital notch filters for use with RF receivers to reduce interference. U.S. Pat. No. 4,703,447 (Lake, Jr.) is directed to a mixer controlled variable passband finite impulse response filter. U.S. Pat. No. 4,703,447 (Lake, Jr.) is directed to a mixer controlled variable passband finite impulse response filter.

A primary purpose of a receiving tuner is to select a particular channel of interest and convert that frequency band to a baseband for digital signal processing. Shown in FIG. 1 of prior art an output 11 of a tuner 10 is processed through an analog to digital converter (ADC) 12 to translate the analog output 11 of the tuner into a digital time domain waveform. Mitigation of sudden spikes in the time domain waveform, which are caused by impulse noise, prevent an accurate demodulation 16 of the digital signal produced by the ADC 12. The output 13 of the ADC 12 is applied to an impulse noise mitigation circuit 14 and the output 15 of the impulse noise mitigation circuit is connected to a demodulator 16.

Shown in FIG. 2 of prior art is an expansion of the impulse noise mitigation 14 for time domain noise mitigation for impulse noise interference detection. An output of a magnitude function 20 is compared to a threshold using a standard comparator 22. the output 23 of the comparator 22 is used as an impulse noise flag by the suppressor circuit 24. The output of the suppressor circuit 15 is connected to the demodulator 16. The detection threshold of the comparator 22 can either be a fixed predetermined value or the detection threshold can be dynamically calculated based on the output 21 of the magnitude function. The suppressor circuit 24 either clips the samples of the digital signal that are found to be impulse noise in the comparator or nulls out the corrupted samples of the digital signal caused by impulse noise.

A shortcoming of the time domain method of impulse noise mitigation, shown in FIG. 2, is the inability to detect the presence of impulse noise under normal or relatively high carrier to interference ratio. The impulse noise can often be buried under the average envelop of the desired signal.

FIG. 3 is an impulse noise mitigation scheme of prior art in the frequency domain. The output of the ADC 13, shown in FIG. 1, is connected to a high pass filter 30 and the output 31 of the high pass filter is connected to a magnitude function 32. The output of the magnitude function 33 is applied to a comparator circuit 34 having a detection threshold control. The output 35 of the comparator is connected to a suppressor circuit 36, which connects 15 back to the demodulator shown in FIG. 1

In the scheme shown in FIG. 3 the detection threshold can be fixed to a predetermined value or dynamically adjusted based on the output 33 of the magnitude function 32. The suppressor circuit 36 either clips the signal samples that are determined to be impulse noise or nulls out the corrupted samples.

The main drawback of the frequency domain method shown in FIG. 3 is the inability to detect the presence of impulse noise under out of band interferers, especially adjacent interferers, where the signal at the output of the magnitude function 33 will contain the energy of both the impulse noise and the interferers thus making the detection of impulse noise unreliable.

SUMMARY OF THE INVENTION

It is an objective of the present invention to provide two complex filters to improve the frequency domain impulse mitigation.

It is still an objective of the present invention wherein a first filter admits only frequency components higher than the desired signal bandwidth in the positive frequency domain and the second filter admits frequency components lower than the desired signal bandwidth in the negative frequency domain.

It is further an objective of the present invention to measure the mean magnitude over a time interval T of each of the two high pass filters in order to select which of the two filters to use to detect and mitigate impulse noise.

In the present invention two complex high pass filters are used to mitigate impulse noise and other noise interferer signals. The response of each individual filter is measured over a time period T to determine which filter provides the best response. This measurement is the mean magnitude of the noise signal that is being removed from the signal being connected to the output of an impulse noise mitigation circuit, whereupon the filter producing the lowest mean magnitude value is chosen for impulse noise mitigation. This selection also dramatically reduces energy of other noise interferer signals. It should be noted that one of the two filters admits frequency components higher than the desired bandwidth on the positive frequency axis and the other of the two filters only admits frequency components lower than the desired signal bandwidth.

BRIEF DESCRIPTION OF THE DRAWINGS

This invention will be described with reference to the accompanying drawings, wherein:

FIG. 1 is a block diagram of a typical communication receiver of prior art;

FIG. 2 is a block diagram of time domain impulse noise mitigation of prior art;

FIG. 3 is a block diagram of frequency domain impulse noise mitigation of prior art;

DETAILED DESCRIPTION OF THE PREFERRED EMBODIMENT

Figure 4:
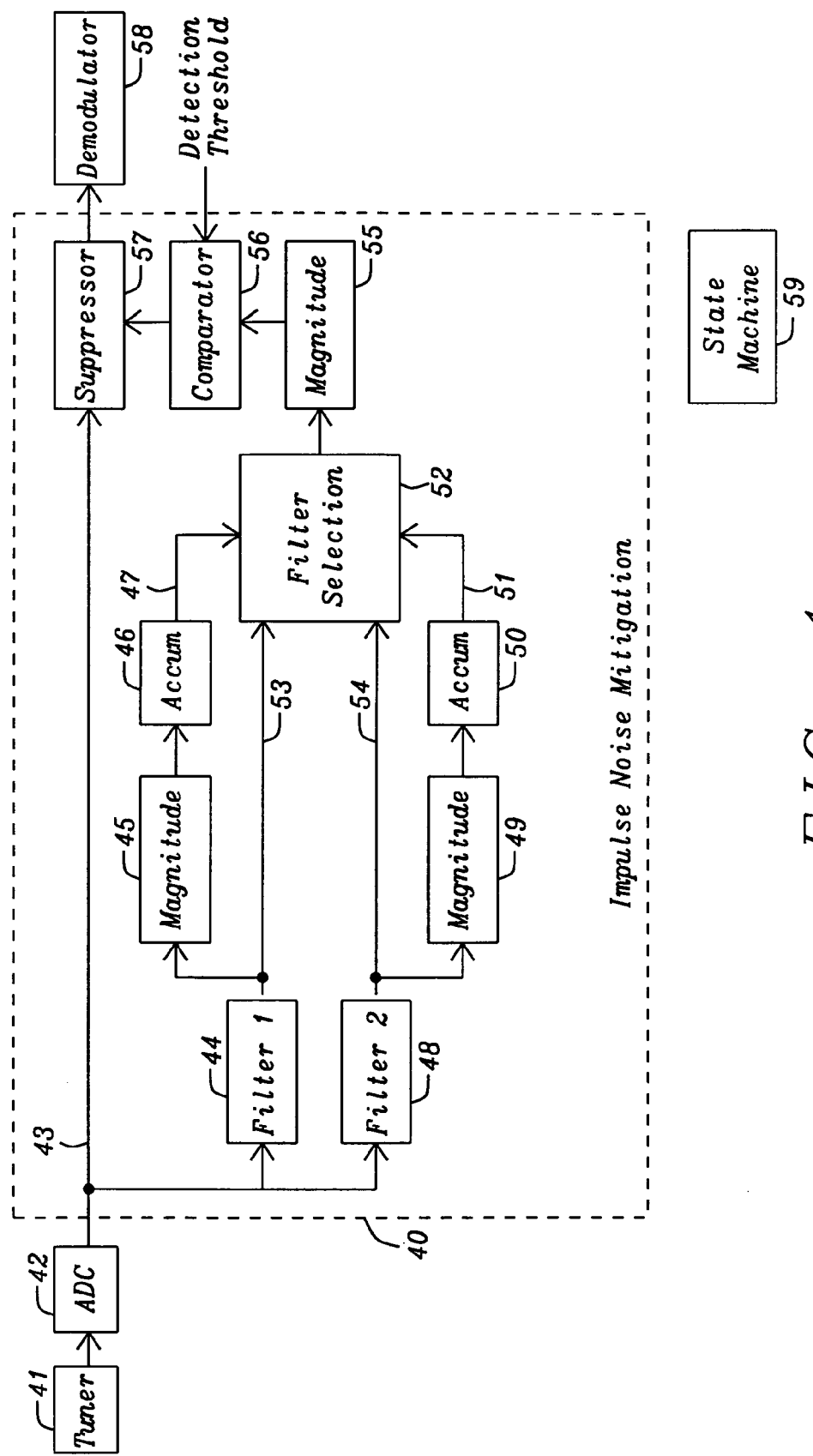
FIG. 4 is a block diagram of the present invention of frequency domain impulse noise mitigation.

In FIG. 4 is shown a block diagram of the frequency domain impulse noise mitigation 40 of the present invention. The output of an analog tuner 41 is connected to an ADC 42 to convert the receiver analog signal into a digital signal. The output 43 of the ADC 42 is coupled to the impulse noise mitigation circuit 40 for the purpose of impulse noise detection. The output of the ADC 43 is also connected to the suppressor circuit 57. When impulse noise is detected from signal samples applied to the filters 44 and 48, these samples will be flagged with an impulse noise indicator, and then the mitigation is applied to the corresponding ADC output connected directly to the suppressor circuit 57.

Within the impulse noise mitigation circuitry 40 are two complex high pass filters 44 and 48, filter 1 and filter 2 respectively. Each of filter output is connected to a magnitude function 45 and 49, respectively, in which outputs of the magnitude functions are connected to accumulator circuits 46 and 50, respectively. After accumulation over T samples, filter selection 52 selects one of Filter1 44 and Filter2 48 by comparing accumulator outputs 47 and 51. The unselected filter can be disabled hereafter to reduce power consumption. The selected filter output is connected to a magnitude, or gain, function 55 that is connected to a comparator 56. A detection threshold is either a fixed to a predetermined value, or dynamically adjusted based on the output of the magnitude function 55. The suppressor circuit 57 connects the noise mitigated signal to the demodulator 58 and either clips the signal samples that are determined to be impulse noise, or nulls out the corrupted samples. A state machine 59 controls the operation of the impulse noise mitigation circuitry 40, including which filter to activate, evaluation of the mean magnitude over T samples for each filter and the filter chosen to mitigate the impulse noise and any interferers.

It should be noted that it is within the scope of the present invention that a single programmable filter can be used, wherein both filters are integrated together and are separately selectable. The programmable filter is first configured similar to filter1 44 and the mean magnitude u1 is measured over T samples. Then the programmable filter is configured similar to filter2 48 and the mean magnitude u2 is measured over T samples. The two mean magnitudes u1 and u2 are compared, and the programmable filter is configured according to the method shown in FIG. 6.

It should also be noted that by using only one filter and disabling the other filter, power consumption can be improved. The purpose of using two filters is to detect impulse noise under out-of-band interference conditions, which is a drawback of the prior art shown in FIG. 3. Thus the present invention improves impulse noise detection by selecting a filter without out-of-band interference.

Figure 5:
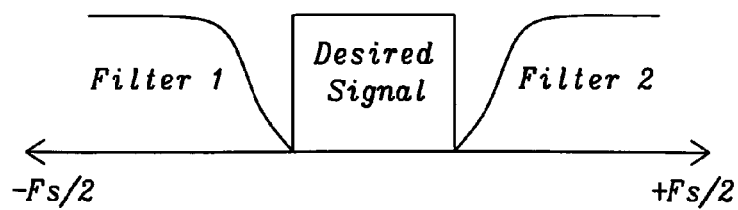
FIG. 5 is a frequency domain diagram showing the effects of the impulse noise mitigation relative to the desired signal.

FIG. 5 demonstrates the effects of the two complex high pass filters of the impulse noise mitigation method of the present invention in the frequency domain. Filter1 only allows frequency components higher than the cut-off frequency of filter1 to pass through the impulse noise mitigation circuit 40 and filter2 only allows frequency components lower than the cut-off frequency of filter2 to pass through the impulse noise mitigation circuit. By collecting the mean signal data over a time duration (or samples) T for each filter the state machine 59 selects which filter to use to detect impulse noise under significant out-of-band interference condition.

Figure 6:
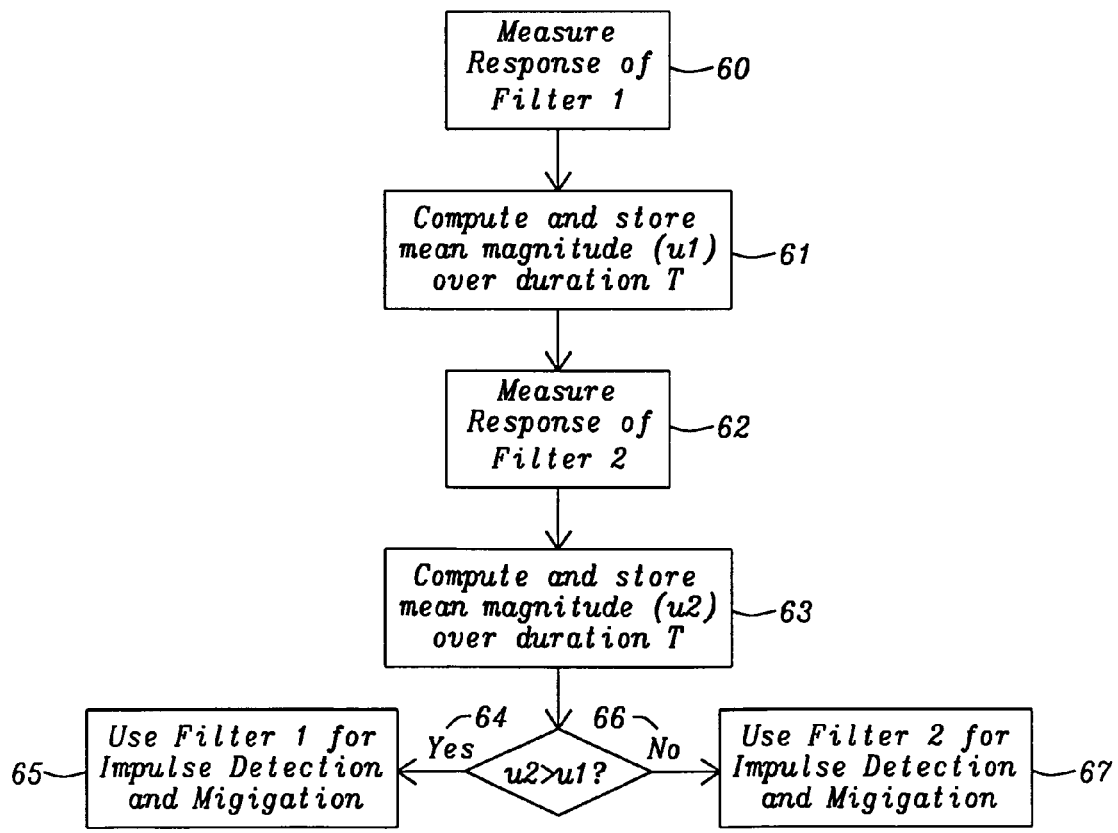
FIG. 6 is a method for impulse noise mitigation of the present invention.

FIG. 6 demonstrates the method for impulse noise mitigation of the present invention. Under control of the state machine 59 the response of the first filter to impulse noise and other interferer frequencies is measured 60. The mean magnitude (u1) of the effects on the incoming signal is computed and stored for the first filter 61 over a time duration (or sample) of "T". Then the response of the second filter to impulse noise and other interferers is measured 62, and the mean magnitude (u2) of the effects on the incoming signal is computed and store for the second filter 63 over a time (or sample) duration of "T". If the computed mean value "u2" is greater than the computed mean value "u1" 64, then the first filter is selected and used for impulse noise detection and mitigation 65. Otherwise if "u1" is greater than or equal to "u2" 66, the second filter is selected and used for impulse noise detection and mitigation 65. The unselected filter can be disabled hereafter to reduce power consumption.

While the invention has been particularly shown and described with reference to preferred embodiments thereof, it will be understood by those skilled in the art that various changes in form and details may be made without departing from the spirit and scope of the invention.

What is claimed is:

1. A system comprising:
a first filter having a first high-pass response, a second filter having a second high-pass response, signal characterization circuitry, a filter selection circuitry, and a comparator, wherein:
said signal characterization circuitry is operable to:
generate a characterization of a first signal output by said first filter in response to a second signal being input to said first filter; and
generate a characterization of a third signal output by said second filter in response to said second signal being input to said second filter;
said filter selection circuit is operable to:
receive said first signal and said third signal; and
select one of said first signal and said third signal based on said characterization of said first signal and said characterization of said third signal; and
said comparator is operable to compare a noise detection threshold and said selected one of said first signal and said third signal.

2. The system of claim 1, comprising a suppressor that is operable to clip samples of said first signal.

3. The system of claim 2, wherein an output of said comparator is coupled to a control input of said suppressor.

4. The system of claim 3, wherein an output of said suppressor is coupled to an input of a demodulator.

5. The system of claim 1, comprising a suppressor that is operable to null samples of said first signal.

6. The system of claim 5, wherein an output of said comparator is coupled to a control input of said suppressor.

7. The system of claim 6, wherein an output of said suppressor is coupled to an input of a demodulator.

8. The system of claim 1, wherein a cutoff frequency of said first filter is higher than a lowest desired frequency of said second signal, and a cutoff frequency of said second filter is lower than said lowest desired frequency of said second signal.

9. The system of claim 1, wherein said signal characterization circuitry comprises an accumulator.

10. The system of claim 1, comprising a tuner and an analog-to-digital converter, wherein:
an output of said tuner is coupled to an input of said analog-to-digital converter; and
said second signal is output by said analog-to-digital converter.

11. A method comprising:
generating, by signal characterization circuitry, a characterization of a first signal output by a first filter in response to a second signal being input to said first filter;
generating, by said signal characterization circuitry, a characterization of a third signal output by a second filter in response to said second signal being input to said second filter;
receiving, by filter selection circuitry, said first signal and said third signal;
selecting, by said filter selection circuitry, one of said first signal and said third signal based on said characterization of said first signal and said characterization of said third signal; and
comparing, by a comparator, a noise detection threshold and an output of said selected one of said first signal and said third signal.

12. The method of claim 11, comprising clipping, by a suppressor, samples of said first signal.

13. The method of claim 12, comprising controlling said clipping based on a signal output of said comparator.

14. The method of claim 3, comprising demodulating, by a demodulator, a signal output by said suppressor.

15. The method of claim 11, comprising nulling, by a suppressor, samples of said first signal.

16. The method of claim 15, comprising controlling said nulling based on a signal output by said comparator.

17. The method of claim 16, comprising demodulating, by a demodulator, a signal output of said suppressor.

18. The method of claim 11, wherein a cutoff frequency of said first filter is higher than a lowest desired frequency of said second signal, and a cutoff frequency of said second filter is lower than said lowest desired frequency of said second signal.

19. The system of claim 1, comprising generating said second signal by digitizing, via an analog-to-digital converter, an output of a tuner.

* * * * *